(12) United States Patent
Yadav et al.

(10) Patent No.: US 9,712,489 B2
(45) Date of Patent: Jul. 18, 2017

(54) CLIENT DEVICE ADDRESS ASSIGNMENT FOLLOWING AUTHENTICATION

(71) Applicant: Aruba Networks, Inc., Sunnyvale, CA (US)

(72) Inventors: Brijesh Kumar Yadav, Varanasi (IN); Rajalakshmi Manoharan, Coimbatore (IN)

(73) Assignee: Aruba Networks, Inc., Sunnyvale, CA (US)

( * ) Notice: Subject to any disclaimer, the term of this patent is extended or adjusted under 35 U.S.C. 154(b) by 211 days.

(21) Appl. No.: 14/445,600

(22) Filed: Jul. 29, 2014

(65) Prior Publication Data

US 2016/0036771 A1 Feb. 4, 2016

(51) Int. Cl.
*H04L 29/12* (2006.01)
*H04L 12/46* (2006.01)
*H04L 29/06* (2006.01)

(52) U.S. Cl.
CPC ...... *H04L 61/2015* (2013.01); *H04L 12/4641* (2013.01); *H04L 12/4675* (2013.01); *H04L 61/203* (2013.01); *H04L 61/2053* (2013.01); *H04L 61/2061* (2013.01); *H04L 63/08* (2013.01)

(58) Field of Classification Search
CPC ..... H04L 61/10; H04L 61/20; H04L 61/2015; H04L 29/12264; H04L 29/12933; H04L 63/08; H04L 63/065; H04L 61/2061; H04L 61/203; H04L 63/10; H04L 12/4641; H04L 12/4675
See application file for complete search history.

(56) References Cited

U.S. PATENT DOCUMENTS

| | | | | |
|---|---|---|---|---|
| 6,393,484 B1 * | 5/2002 | Massarani | ............... | H04L 61/10 709/225 |
| 7,792,110 B2 * | 9/2010 | Winner | ............... | H04L 12/4641 370/390 |
| 8,363,658 B1 * | 1/2013 | Delker | ................ | H04L 12/4641 370/252 |

(Continued)

OTHER PUBLICATIONS

Wikipedia, "Extensible Authentication Protocol", orginial date Mar. 2005, printed on Apr. 18, 2016.*

(Continued)

*Primary Examiner* — Ramy M Osman
(74) *Attorney, Agent, or Firm* — Brooks, Cameron & Huebsch, PLLC

(57) ABSTRACT

Methods and systems are described for assigning the proper internet protocol (IP) address to a client device following authentication of the client device on a network. In particular, at commencement of an authentication procedure of the client device, a role is associated with the client device that denies all DHCP renews/requests. By assigning a role to the client device 103 with a "deny DHCP renew/request" rule at the commencement of an authentication procedure, the systems and methods described herein ensure that a race condition does not allow the client device to renew an IP address in an old segment of the network. Accordingly, the client device may avoid a possibly improper IP address in a segment of the network system in which the client device is no longer associated with or operating on.

18 Claims, 4 Drawing Sheets

(56) References Cited

U.S. PATENT DOCUMENTS

| | | | | |
|---|---|---|---|---|
| 8,375,109 B1* | 2/2013 | Lange | H04L 61/2015 | 709/221 |
| 8,677,450 B2* | 3/2014 | Lum | H04L 63/20 | 726/1 |
| 8,887,237 B2* | 11/2014 | Janakiraman | H04L 61/2015 | 713/150 |
| 2004/0047320 A1* | 3/2004 | Eglin | G06Q 50/24 | 370/338 |
| 2005/0044271 A1* | 2/2005 | Bastide | H04L 61/20 | 709/245 |
| 2005/0063400 A1* | 3/2005 | Lum | H04L 63/20 | 370/401 |
| 2005/0246771 A1* | 11/2005 | Hunt | H04L 61/2015 | 726/18 |
| 2006/0190721 A1* | 8/2006 | Kawakami | H04L 63/08 | 713/161 |
| 2007/0230457 A1* | 10/2007 | Kodera | H04L 63/08 | 370/389 |
| 2007/0237148 A1* | 10/2007 | Jabr | H04L 12/467 | 370/392 |
| 2008/0071890 A1* | 3/2008 | Meier | H04L 29/12933 | 709/220 |
| 2008/0307114 A1* | 12/2008 | Ooshima | H04L 63/0272 | 709/250 |
| 2009/0222590 A1* | 9/2009 | Van Aken | H04L 12/2801 | 709/249 |
| 2012/0084840 A1* | 4/2012 | Higuchi | H04L 63/08 | 726/4 |
| 2012/0291098 A1* | 11/2012 | Janakiraman | H04L 61/2015 | 726/3 |
| 2013/0013810 A1* | 1/2013 | Allan | H04L 29/12264 | 709/245 |
| 2014/0226818 A1* | 8/2014 | Wang | H04L 63/065 | 380/270 |
| 2015/0312208 A1* | 10/2015 | Chatterjee | H04L 61/2015 | 709/245 |
| 2016/0036771 A1* | 2/2016 | Yadav | H04L 61/2015 | 709/223 |
| 2016/0100356 A1* | 4/2016 | Liu | H04L 61/203 | 370/329 |

OTHER PUBLICATIONS

Cisco, "Catalyst 3750-X and 3560-X Switch Software Configuration Guide", Nov. 2014, Release 12.2(55)SE, Chapter 11.*

* cited by examiner

CLIENT DEVICE ADDRESS ASSIGNMENT FOLLOWING AUTHENTICATION

TECHNICAL FIELD

The present disclosure relates to assigning the proper internet protocol (IP) address to a client device following authentication of the client device on a network.

BACKGROUND

Over the last decade, there has been a substantial increase in the use and deployment of network enabled client devices. These client devices may join a network system such that the client devices may have access to other devices on the network system. For example, a client device may join a network system through a wired Ethernet connection between the client device and a router operating within the network system.

Based on the ease with which client devices may establish physical connections with components within a network, some systems have mandated the use of authentication protocols to control entry of client devices to the network system. These authentication protocols verify that the client device is allowed to access the network and subsequently provide authenticated client devices with an internet protocol (IP) for operating within a secure section of the network system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

Figure 1:
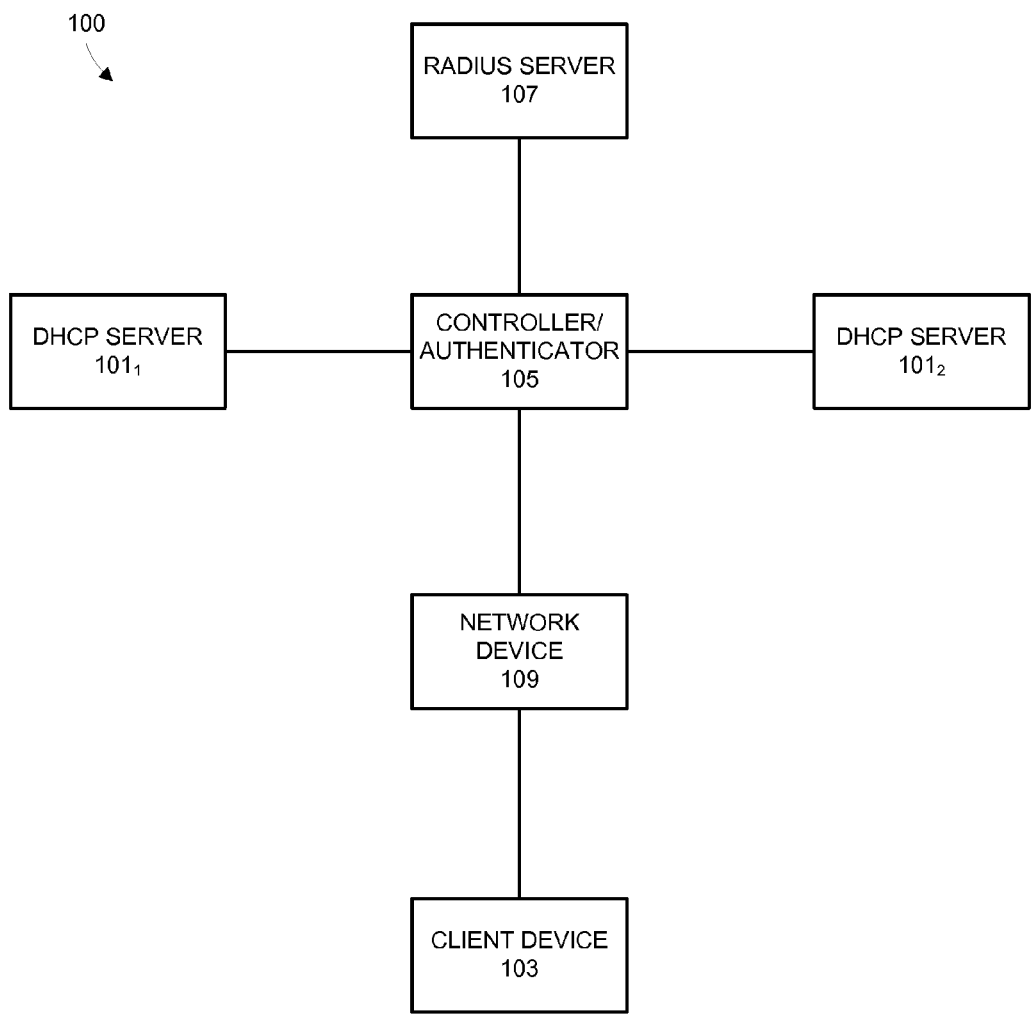
FIG. 1 shows a block diagram example of a network system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

Herein, certain terminology is used to describe features for embodiments of the disclosure. For example, the term "digital device" generally refers to any hardware device that includes processing circuitry running at least one process adapted to control the flow of traffic into the device. Examples of digital devices include a computer, a tablet, a laptop, a desktop, a netbook, a server, a web server, an authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a television peripheral, a printer, a mobile handset, a smartphone, a personal digital assistant "PDA", a wireless receiver and/or transmitter, an access point, a base station, a communication management device, a router, a switch, and/or a controller.

It is contemplated that a digital device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage medium (e.g., a programmable circuit; a semiconductor memory such as a volatile memory and/or random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the terms "logic" (or "logic unit") are generally defined as hardware and/or software. For example, as hardware, logic may include a processor (e.g., a microcontroller, a microprocessor, a CPU core, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission medium (e.g., electrical, optical, acoustical or other form of propagated signals such as carrier waves, infrared signals, or digital signals).

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Network System

FIG. 1 shows a block diagram example of an enterprise network system 100 in accordance with one or more embodiments. The network system 100, as illustrated in FIG. 1, is a digital system that may include one or more Dynamic Host Configuration Protocol (DHCP) servers $101_1$ and $101_2$, a client device 103, a network controller/authenticator 105, a Remote Authentication Dial In User Service (RADIUS) server 107, and a network device 109. In one embodiment, the client device 103 may be connected to the network controller 105 via the network device 109 as shown in FIG. 1. In another embodiment, the client device 103 may be connected directly to the network controller 105 without the use of the network device 109.

As will be described in greater detail below, the network controller 105 and/or the RADIUS server 107 may provide authentication services for new devices entering the network system 100 (e.g., the client device 103). In these embodiments, the network controller 105 and the network system 100 may operate multiple virtual local area networks (VLANs) or other discrete segments. For example, the client device 103 may initially be associated with a VLAN X upon first connecting to the network system 100. In the VLAN X, the DHCP server $101_1$ may assign an internet protocol (IP) address to the client device 103 such that the client device 103 may operate on the VLAN X. Upon being authenticated, the client device 103 may move to the VLAN Y, where the client device 103 receives a new IP address from the DHCP server $101_2$. The IP address from the DHCP server $101_2$ allows the client device 103 to operate on the VLAN Y.

Each of the concepts for authentication of the client device 103 and separately assigning IP addresses to the client device 103 for the VLAN X and the VLAN Y will be described in greater detail below. These techniques may ensure that the client device 103 may receive a proper IP address based on the VLAN the client device 103 is currently associated with. Each element of the network system 100 will now be described.

Figure 2:
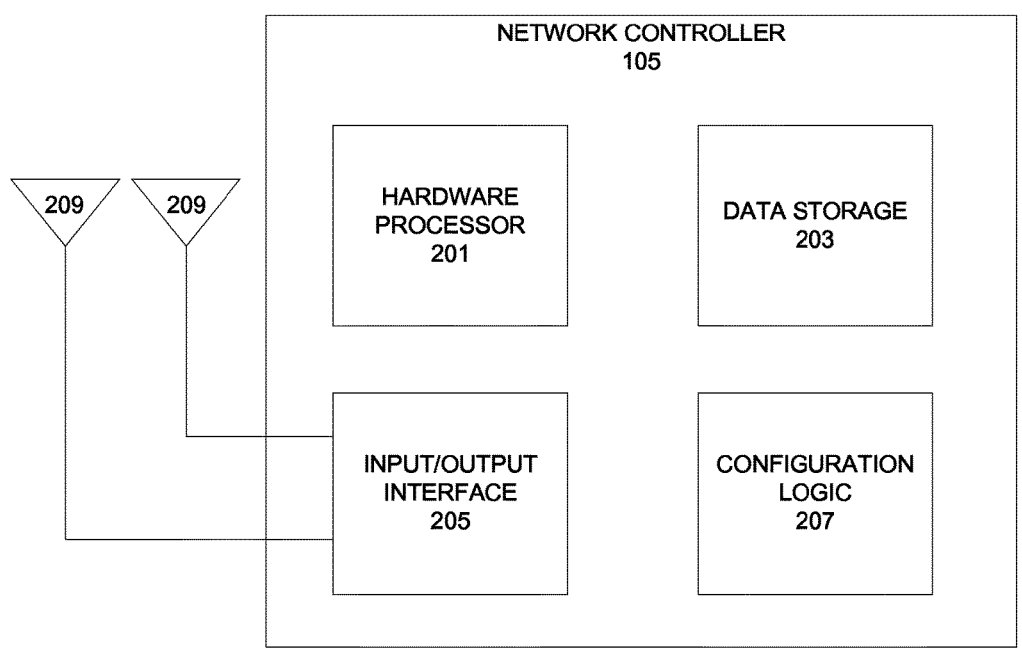
FIG. 2 shows a component diagram of a controller according to one embodiment.

The network controller 105 may be any device that can associate with the client device 103 and/or other components of the network system 100 to transmit and receive data over wired and/or wireless connections. In one embodiment, the network controller 105 may correspond to a network device such as an access point or a switch. FIG. 2 shows a component diagram of the network controller 105 according to one embodiment.

As shown in FIG. 2, the network controller 105 may comprise one or more of: a hardware processor 201, data storage 203, an input/output (I/O) interface 205, and device configuration logic 207. Each of these components of the network controller 105 will be described in further detail below.

The data storage 203 of the network controller 105 may include a fast read-write memory for storing programs and data during operations and a hierarchy of persistent memory, such as Read Only Memory (ROM), Erasable Programmable Read Only Memory (EPROM,) and/or Flash memory for example, for storing instructions and data needed for the startup and/or operation of the network controller 105. In one embodiment, the data storage 203 is a distributed set of data storage components. The data storage 203 may store data that is to be transmitted from the network controller 105 or data that is received by the network controller 105. For example, the network controller 105 may store data to be forwarded to the client devices 103 or to one or more other devices in the network system 100.

In one embodiment, the I/O interface 205 corresponds to one or more components used for communicating with other devices (e.g., the client device 103, other devices within the system 100, and/or devices external to the system 100) via wired or wireless signals. The I/O interface 205 may include a wired network interface such as an IEEE 802.3 Ethernet interface and/or a wireless interface such as an IEEE 802.11 WiFi interface. The I/O interface 205 may communicate with the client device 103 over corresponding wired or wireless connections.

In some embodiments, the I/O interface 205 may include one or more antennas 209 for communicating with other devices. For example, multiple antennas 209 may be used for forming transmission beams to the client device 103 through adjustment of gain and phase values for corresponding antenna 209 transmissions. The generated beams may avoid objects and create an unobstructed path to the client device 103. In some embodiments, the multiple antennas 209 may be used for performing multipath transmissions and receiving multiple transmissions from the client device 103 and/or another wireless network device.

In one embodiment, the hardware processor 201 is coupled to the data storage 203 and the I/O interface 205. The hardware processor 201 may be any processing device including, but not limited to a MIPS/ARM-class processor, a microprocessor, a digital signal processor, an application specific integrated circuit, a microcontroller, a state machine, or any type of programmable logic array.

In one embodiment, the device configuration logic 207 includes one or more functional units implemented using firmware, hardware, software, or a combination thereof for configuring parameters associated with the client device 103. For example, the device configuration logic 207 may be used for facilitating authentication of the client device 103 in the network system 100 as will be described in greater detail below.

The network device 109 may be any piece of network equipment used to facilitate communications between the client device 103 and the network controller 105. For example, the network device 109 may be an access point, a router, a switch, a hub, or any similar device. In one embodiment, the network device 109 may be similarly configured as described above in relation to the network controller 105. For example, the network device 109 may comprise hardware processor 201, data storage 203, input/output (I/O) interface 205, and device configuration logic 207 in a similar fashion as described above in relation to the network controller 105. As noted above, in some embodiments, the network device 109 may not be present in the network system 100 and the client device 103 may directly connect with the network controller 105.

The RADIUS server 107 may be any device that facilitates the authentication of the client device 103 in the network system 100 as will be described in greater detail below. In one embodiment, this authentication may be performed in coordination with the network controller 105. The RADIUS server 107 may operate using any authentication protocol. For example, the authentication server 107 may operate to implement IEEE 802.1X or any other authentication protocol. In one embodiment, the RADIUS server 107 may be similarly configured as described above in relation to the network controller 105. For example, the authentication server 107 may each comprise hardware processor 201, data storage 203, input/output (I/O) interface 205, and device configuration logic 207 in a similar fashion as described above in relation to the network controller 105.

The DHCP servers $101_1$ and $101_2$ may be any devices that dynamically distribute network configuration parameters, such as IP addresses, to the client device 103. In one embodiment, the DHCP servers $101_1$ and $101_2$ may operate in relation to separate VLANs. For example, the DHCP server $101_1$ may distribute IP addresses for the VLAN X operating within the network system 100 while the DHCP server $101_2$ may distribute IP addresses for the VLAN Y, which also operates within the network system 100. In this example, the VLAN X and the VLAN Y may be assigned separate ranges of IP addresses that are available for distribution in each respective network segment.

In one embodiment, the DHCP servers $101_1$ and $101_2$ may be similarly configured as described above in relation to the network controller 105. For example, the DHCP servers $101_1$ and $101_2$ may each comprise hardware processor 201, data storage 203, input/output (I/O) interface 205, and device configuration logic 207 in a similar fashion as described above in relation to the network controller 105.

Although shown and described as being separate machines, in one embodiment the DHCP servers $101_1$ and $101_2$ may be implemented by the same device or set of devices. In one embodiment, one or more of the components of the DHCP servers $101_1$ and $101_2$ may be within the network controller 105. In this embodiment, one or more of the DHCP servers $101_1$ and $101_2$ may be implemented by the network controller 105.

In one embodiment, the client device 103 may be any wired or wireless electronic device capable of receiving and transmitting data over wired or wireless mediums. For example, the client device 103 may be one or more of a personal computer, a laptop computer, a netbook computer, a wireless music player, a portable communication device, a smart phone, a tablet computer, and a digital television. In one embodiment, the client device 103 is a digital device that includes a hardware processor, memory hierarchy, and input/output (I/O) interfaces including a wired and/or wireless interface such as an IEEE 802.11 interface. In one embodiment, the configuration of the components within the client device 103 may be similar to those discussed above in relation to the network controller 105.

Authentication of the Client Device 103

Figure 3:
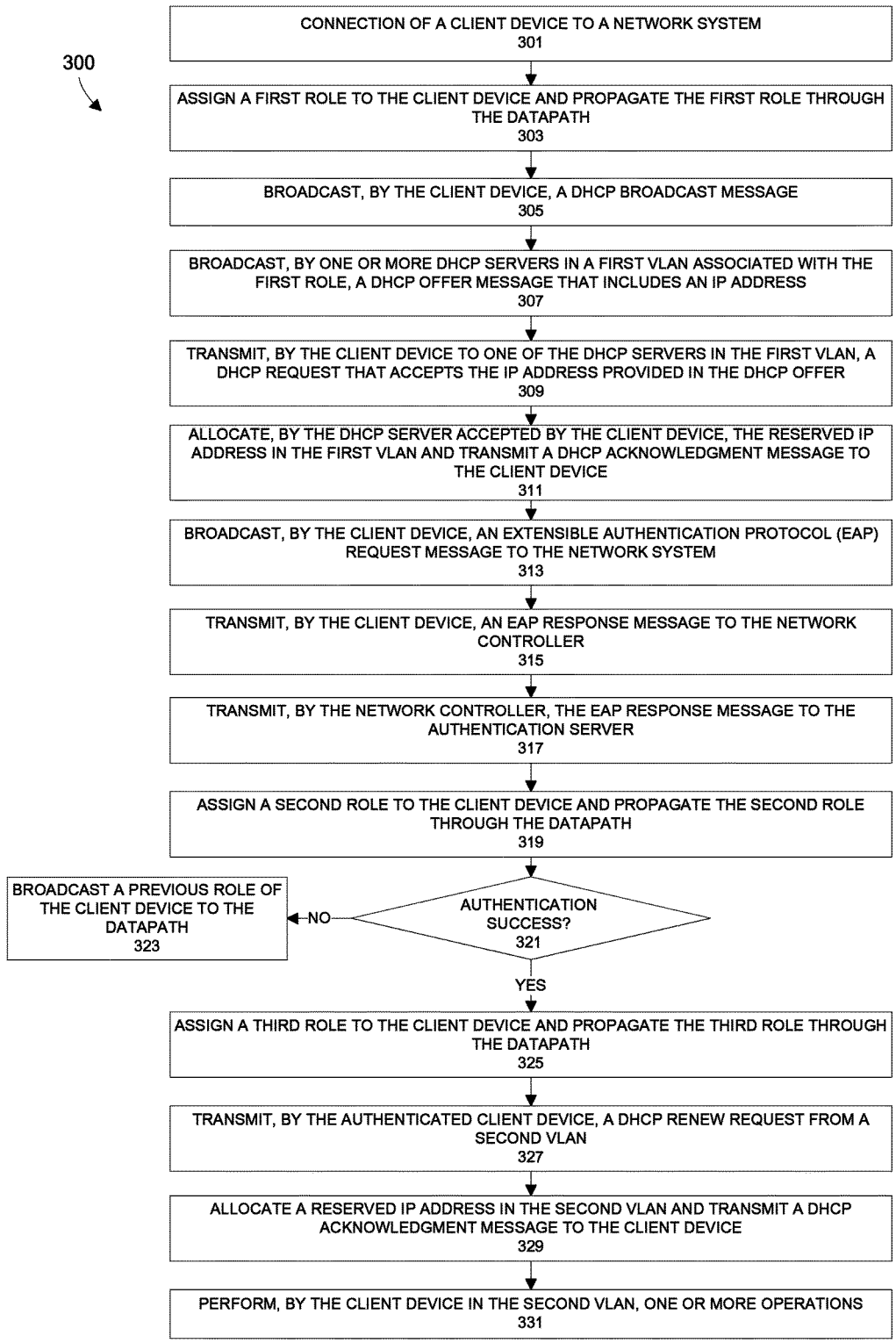
FIG. 3 shows a method for authenticating a client device on the network system according to one embodiment.

Turning now to FIG. 3, a method 300 for authenticating the client device 103 on the network system 100 will now be described. As will be discussed in greater detail below, the method 300 ensures that the client device 103 receives a valid/proper IP address on the correct VLAN upon successful authentication of the client device 103 within the network system 100. Each operation of the method 300 will be described below by way of example.

Although the operations of the method 300 are shown and described in a particular order, in other embodiments the operations may be performed in a different order. For example, in some embodiments, two or more operations of the method 300 may be performed concurrently and/or during overlapping time periods.

In one embodiment, the method 300 may commence at operation 301 with the connection of the client device 103 to the network system 100. In one embodiment, this connection may be established through the coupling of the client device 103 to the network controller 105. For example, the coupling may be facilitated through a physical wire (e.g., a Category 5 or Category 6 cable) that is connected at one end to the client device 103 and at another end to the network controller 105. In this example, the physical wire may be coupled to corresponding physical ports of the client device 103 and the network controller 105 (e.g., coupled at corresponding Ethernet ports).

In one embodiment, the client device 103 may be connected at operation 301 directly to the network controller 105 while in other embodiments, the client device 103 may be connected indirectly to the network controller 105 via the network device 109. In this second embodiment, communications/messages may be forwarded through the network device 109 to the network controller 105 and subsequently to other portions of the network system 100.

Following connection of the client device 103 to the network system 100, the client device 103 may be assigned a first role at operation 303. In one embodiment, the first role assigned at operation 303 may indicate that the client device 103 has not been authenticated on the network system 100 and accordingly the client device 103 is not authorized to be connected with or join secure portions of the network system 100. For example, the first role may restrict the client device 103 to associate with a VLAN X that is utilized during machine authentication procedures for devices that are newly joining the network system 100.

In one embodiment, assignment of the first role at operation 303 may include the transmission of this role throughout the datapath. For example, the first role of the client device 103 may be transmitted to one or more of the network controller 105, the DHCP servers $101_1$ and $101_2$, the RADIUS server 107, and the network device 109. In this embodiment, the port at which the client device 103 is connected to the network controller 105 and/or the network device 109 may be bound to a VLAN X in a VLAN table. Accordingly, operation 303 may distribute the first role of the client device 103 and/or an association of the client device 103 to a particular VLAN throughout the datapath to ensure that other devices in the network system 100 are aware of the role and/or VLAN association of the client device 103.

Figure 4:
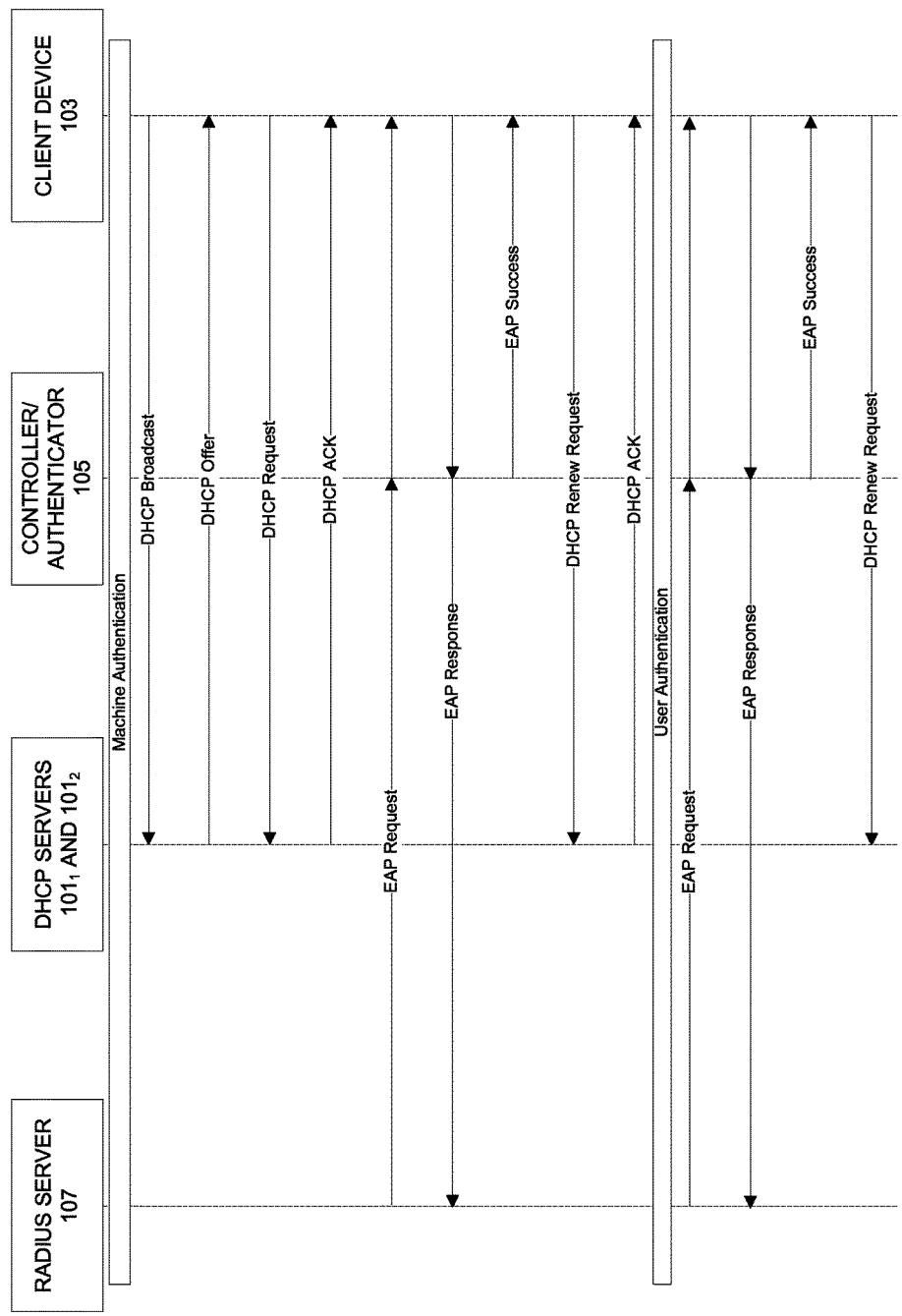
FIG. 4 shows a data sequence diagram for authenticating the client device on the network system according to one embodiment.

Following operation 303, the client device 103 may transmit a DHCP broadcast message in the network system 100 at operation 305 as shown in the data sequence diagram in FIG. 4. The DHCP broadcast message 1) attempts to seek out DHCP servers (e.g., the DHCP servers $101_1$ and/or $101_2$) and 2) requests an IP address for the client device 103. In one embodiment, the client device 103 may discover the DHCP servers $101_1$ and $101_2$ by broadcasting the discover message to the limited broadcast address (e.g., limited to the address 255.255.255.255) on the local subnet. If the network device 109 is present and configured to behave as a BOOTP relay agent, the discover message is passed to other DHCP servers on different subnets. The broadcast message may include a unique identifier for the client device 103. For example, the unique identifier may be derived from the Media Access Control (MAC) address of the client device 103. On an Ethernet network, the MAC address may be the same as the Ethernet address.

Following transmission of the discover message, one or more of the DHCP servers $101_1$ and $101_2$ within the same VLAN as the client device 103 (i.e., same broadcast domain) may broadcast a DHCP offer message intended for the client device 103 at operation 307. The DHCP offer message may include an IP address selected for the client device 103 (i.e., an IP address from VLAN X) and information about services that can be configured for the client device 103.

In one embodiment, the DHCP servers $101_1$ and $101_2$ that receive the discover message can determine the VLAN/network of the client device 103 by looking at several pieces of information. For example, the DHCP servers $101_1$ and $101_2$ may examine which network interface/port the DHCP discover message came in and comparing this information with a VLAN/network table. In this example, the DHCP servers $101_1$ and $101_2$ may determine either that the client device 103 is on the VLAN/network to which the interface is connected (i.e., based on a binding of the network interface/port to a VLAN/network), or that the client device 103 is using a BOOTP relay agent connected to that VLAN/network (e.g., the network device 109).

The DHCP servers $101_1$ and $101_2$ may also determine whether the DHCP discover message includes the IP address of a BOOTP relay agent. When a DHCP discover message passes through a relay agent, the relay agent inserts its IP address in the DHCP discover message header. When the DHCP servers $101_1$ and $101_2$ detect a relay agent address, the DHCP servers $101_1$ and $101_2$ know that the network portion of the address indicates the client device's 103 network address because the relay agent must be connected to the network of the client device 103.

The DHCP servers 101₁ and 101₂ may also determine whether a VLAN/network associated with the client device 103 has been sub-netted. In this embodiment, the DHCP servers 101₁ and 101₂ may consult the netmask table to find the subnet mask used on the VLAN/network indicated by the relay agent's address or by the address of the network interface that received the request. Once the DHCP servers 101₁ and 101₂ know the subnet mask used, the servers 101₁ and 101₂ can determine which portion of the network address is the host portion. Thereafter, the servers 101₁ and 101₂ may select an IP address appropriate for the client device 103.

Since the client device 103 is currently assigned the first role and associated with the VLAN X, the client device 103 may be issued an IP address at operation 307 corresponding to the VLAN X. As described above, this assignment may be based on the binding of the network interface/port of client device 103 to the VLAN X in a VLAN table. In one embodiment, one of the DHCP servers 101₁ and 101₂ may assign the IP address to the client device 103 at operation 307. For example, in one embodiment, the DHCP server 101₁ may be associated with the VLAN X while the DHCP server 101₂ may be associated with the VLAN Y. In this example, the VLAN X may assign an IP address in the range of addresses associated with the VLAN X at operation 307. The DHCP server 101₁ may ensure that the IP address inserted in the DHCP offer is not being utilized by another device. Further, the DHCP server 101₁ may reserve the IP address for the client device 103 for a prescribed time period. Upon the client device 103 failing to respond to the DHCP offer within this time period, the DHCP server 101₁ may cancel the reservation of the IP address.

At operation 309, the client device 103 may transmit a DHCP request message indicating acceptance to the DHCP offer from operation 307. In one embodiment, the client device 103 may have received multiple DHCP offers from multiple servers (e.g., the DHCP server 101₁ and the DHCP server 101₂). In this embodiment, the client device 103 may select the best DHCP offer based on the number and type of services offered. The client device 103 may broadcast the DHCP request that specifies the IP address of the server 101₁ or 101₂ that made the best offer. The broadcast ensures that all the responding DHCP servers 101₁ and 101₂ know that the client device 103 has chosen a server 101₁ and 101₂. The servers 101₁ or 101₂ that are not chosen can cancel the reservations for the IP addresses that they had offered.

At operation 311, the selected DHCP server 101₁ or 101₂ allocates the IP address for the client device 103 and stores the information in a DHCP data store. The selected DHCP server 101₁ or 101₂ also may send a DHCP acknowledgement message (ACK) to the client device 103 at operation 311. The acknowledgement message may contain the network configuration parameters for the client device 103. The client device 103 may use a ping utility to test the IP address assigned to the client device 103 to ensure that no other device is using the assigned address. The client device 103 may thereafter continue the process of joining the network system 100.

At operation 313, the network controller 105 may broadcast an Extensible Authentication Protocol (EAP) request message to the network system 100. This broadcast may be in response to detection of a new device on the network system 100 and/or on the VLAN X (e.g., the client device 103). The network controller 105 may open a port to accept EAP traffic and drop all other traffic on this port. The EAP request message may indicate that the network controller 105 would like to perform machine authentication according to a particular authentication protocol (e.g., IEEE 802.1X authentication protocols and/or standards) for new devices on the network system 100. In one embodiment, this message transmission may be performed in conjunction with the RADIUS server 107.

At operation 315, the client device may respond to the EAP request message with an EAP response message. The EAP response message may indicate the identity of the client device 103 (e.g., an identifier of the client device 103). In one embodiment, this message transmission may be performed in conjunction with the RADIUS server 107.

Following transmission of the EAP response message, operation 319 may assign a second role to the client device 103. This second role may overwrite the first role and may indicate that any DHCP request/renew messages from the client device 105 should be denied until an EAP success message has been transmitted and a new role and/or a new binding of the port associated with the client device 103 has been propagated throughout the datapath.

In prior systems, the client device 103 would be connected to the VLAN X to perform machine authentication. Accordingly, the client device 103 is associated with the VLAN X during this time period such that DHCP requests received from the client device 103 are associated with the VLAN X (i.e., the client device 103 receives IP addresses associated with the VLAN X). Per the IEEE 802.1X protocol, upon receiving an EAP success message the client device 103 immediately transmits a DHCP renew/request message. In particular, this DHCP renew/request message may be transmitted by the client device 103 approximately 10 ms after receipt of the EAP success message. Since the DHCP renew/request message is transmitted quickly after the EAP success was received, the datapath may not have been updated to reflect any new binding of the client device 103, which may have been instigated by authentication success.

In particular, the client device 103 may have been moved from the VLAN X, which is used for machine authentication, to the VLAN Y, which may be used for other processes including user authentication. Since the datapath may not have been updated to reflect this change, a DHCP renew/request message transmitted by the client device 103 may be responded to by one or more of the DHCP servers 101₁ and 101₂ as though the client device 103 is still associated with the VLAN X. Accordingly, the client device 103 will receive an IP address associated with the VLAN X instead of VLAN Y. Once the datapath is correctly updated to reflect the association of the client device 103 with the VLAN Y, the client device 103 will have an invalid IP on this VLAN Y (i.e., the client device 103 will have an IP address that is associated with the VLAN X). Consequently, messages/packets transmitted to the client device 103 will not be correctly routed as the client device 103 will maintain an invalid IP address on the VLAN Y.

To address this issue, the second role may indicate that all DHCP renew/request messages from the client device 103 are to be denied with a negative-acknowledgement (NACK) message until the datapath has been updated with the new association of the client device 103 following an EAP success message. This "deny DHCP renew/request" rule may be enforced by a firewall to deny DHCP traffic at position one and other traffic for the client device 103 handled as per a separate set of rules set by a network administrator. Accordingly, the "deny DHCP renew/request"

rule may take precedence over other rules and cannot be edited or deleted such that the client device 103 is barred from renewing an IP address during this critical period. Further, by assigning the second role to the client device 103 after waiting for a response from the client device 103, the method 300 ensures that the client device 103 is compatible with the currently utilized authentication protocol (e.g., IEEE 802.1X). Namely, since the client device 103 has responded to the EAP request message, it is clear that the client device 103 supports the currently utilized authentication protocol.

At operation 321, a result of the machine authentication initiated at operation 313 may be examined. When the result of the machine authentication is a failure (i.e., receipt of an EAP failure message), a previous role of the client device 103 may be assigned to the client device 103 and downloaded/broadcast to the datapath at operation 323. For example, the client device 103 may revert to the first role. This previous role may overwrite the second role such that the "deny DHCP renew/request" rule of the second role may no longer be active for the client device 103 and the client device 103 may request a new IP address.

Conversely, upon detection of machine authentication success at operation 321 (i.e., receipt of an EAP success message), operation 325 may assign a third role for the client device 103. This third role may also be broadcast/downloaded to the datapath. This third role allows DHCP request/renew messages to be handled by the DHCP servers 101$_1$ and 101$_2$ and associates the client device 103 with the VLAN Y. This third role may overwrite the second role such that the "deny DHCP renew/request" of the second role may no longer be active for the client device 103 and the client device 103 may request a new IP address (i.e., an IP address for the VLAN Y).

At operation 327, the client device 103 may transmit a DHCP renew/request message. Since the role of the client device 103 has now changed to allow issuance of a new IP address (i.e., the third role does not include a "deny DHCP renew/request" rule) a DHCP acknowledgement (ACK) message may be transmitted from a DHCP server 101$_1$ or 101$_2$ at operation 329 with a new IP address (e.g., an IP address for the VLAN Y). Previous to downloading the third role to the datapath, any DHCP renew/request message from the client device 103 would have received a NACK message as discussed above. However, since the third role has now been updated in the datapath and the "deny DHCP renew/request" rule is no longer applied for the client device 103, DHCP renew/request messages may be replied to with ACK messages. Further, since the third role indicates an association with the VLAN Y, the ACK message received from the corresponding DHCP server 101$_1$ or 101$_2$ may assign an IP address for the VLAN Y.

At operation 331, one or more processes may be performed by the client device 103 on the VLAN Y. For example, as shown in FIG. 4, user authentication may be performed on the VLAN Y.

As described above, the method 300 ensures that the client device 103 receives an IP address for a VLAN on which the client device 103 has been authenticated to operate within. In particular, by assigning a role to the client device 103 with a "deny DHCP renew/request" rule at the commencement of an authentication procedure, the method 300 ensures that a race condition does not allow the client device 103 to renew an IP address on the old VLAN. Accordingly, the client device 103 may avoid a possibly improper IP address in a segment of the network system 100 (e.g., the VLAN X) in which the client device 103 is no longer associated with or operating on.

An embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components. Also, although the discussion focuses on uplink medium control with respect to frame aggregation, it is contemplated that control of other types of messages is applicable.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions, executed by a hardware processor, to:
   detect an authentication request transmitted by a client device while the client device is assigned a first role such that the client device is associated with a first VLAN and DHCP requests received from the client device are forwarded to at least one DHCP server associated with the first VLAN;
   responsive to detecting the authentication request, assign the client device to a second role such that DHCP requests received from the client device in the second role are declined independent of availability of an internet protocol (IP) address associated with the first VLAN; and
   responsive to successfully completing authentication of the client device, assign the client device to a third role such that the client device is associated with a second VLAN and DHCP requests received from the client device are forwarded to at least one DHCP server associated with the second VLAN,
   wherein while the client device is assigned to the second role:
   receive a DHCP request from the client device; and
   decline the DHCP request from the client based on rules associated with the second role, wherein the rules include declining the DHCP request until an Extensible Authentication Protocol (EAP) success message is received from the client device.

2. The medium of claim 1, further comprising instructions to responsive to failing to complete authentication of the client device, assign the client device back to the first role.

3. The medium of claim 1, wherein DHCP request messages received from the client device are declined for a period of time between successfully authenticating the client device and the assignment of the client device to the third role.

4. The medium of claim 1, wherein any DHCP requests received from the client device are declined during both a first period of time between detecting the authentication request transmitted by the client device and successfully completing authentication of the client device and a second period of time between successfully completing authentication of the client device and the assignment of the client device to the third role.

5. The medium of claim 1, wherein the detecting operation is performed by a controller or an access point.

6. The medium of claim 1, wherein the declining DHCP requests received from the client device while the client device is assigned to the second role is performed by a firewall application executing on a network device.

7. The medium of claim 1, further comprising instructions to, subsequent to assigning the third role to the client device:
receive from the client device a particular DHCP request; and
forward the particular DHCP request to a DHCP server associated with the second VLAN.

8. The medium of claim 1, further comprising instructions to, while the client device is assigned to the second role:
receive from the client device one or more requests other than DHCP requests; and
forward and/or grant the one or more requests.

9. The medium of claim 1, further comprising instructions to:
transmit an Extensible Authentication Protocol (EAP) response message to an authentication server; and
responsive to transmitting the EAP response message, assign the client device to the second role, wherein the instructions to assign the client device to the second role comprise instructions to overwrite the first role with the second role.

10. A system comprising:
a client device; and
a network controller comprising a hardware processor, wherein the hardware processor includes instructions to:
detect an authentication request transmitted by a client device while the client device is assigned a first role such that the client device is associated with a first VLAN and DHCP requests received from the client device are forwarded to at least one DHCP server associated with the first VLAN;
responsive to detecting the authentication request, assign the client device to a second role such that DHCP requests received from the client device in the second role are declined independent of availability of an internet protocol (IP) address associated with the first VLAN; and
responsive to successfully completing authentication of the client device, assign the client device to a third role such that the client device is associated with a second VLAN and DHCP requests received from the client device are forwarded to at least one DHCP server associated with the second VLAN,
wherein while the client device is assigned to the second role:
receive a DHCP request from the client device; and
decline the DHCP request from the client based on rules associated with the second role, wherein the rules include declining the DHCP request until an Extensible Authentication Protocol (EAP) success message is received from the client device.

11. The system of claim 10, wherein the hardware processor further includes instructions to, responsive to failing to complete authentication of the client device, assign the client device back to the first role.

12. The system of claim 10, wherein DHCP request messages received from the client device are declined for a period of time between successfully authenticating the client device and the assignment of the client device to the third role.

13. The system of claim 10, wherein any DHCP requests received from the client device are declined during both a first period of time between detecting the authentication request transmitted by the client device and successfully completing authentication of the client device and a second period of time between successfully completing authentication of the client device and the assignment of the client device to the third role.

14. The system of claim 10, further comprising a controller or an access point, wherein the detecting operation is performed by the controller or the access point.

15. The system of claim 10, further comprising a network device, wherein the DHCP requests received from the client device while the client device is assigned to the second role are declined by a firewall application executing on a network device.

16. The system of claim 10, wherein the hardware processor further includes instructions to, subsequent to assigning the third role to the client device:
receive from the client device a particular DHCP request; and
forward the particular DHCP request to a DHCP server associated with the second VLAN.

17. The system of claim 10, wherein the hardware processor further includes instructions to, while the client device is assigned to the second role:
receive from the client device one or more requests other than DHCP requests; and
forward and/or grant the one or more requests.

18. The system of claim 10, wherein the hardware processor further includes instructions to:
transmit an Extensible Authentication Protocol (EAP) response message to an authentication server; and
responsive to transmitting the EAP response message, assign the client device to the second role, wherein the instructions to assign the client device to the second role comprise instructions to overwrite the first role with the second role.

* * * * *